(12) United States Patent
Yamaguchi et al.

(10) Patent No.: US 8,602,330 B2
(45) Date of Patent: Dec. 10, 2013

(54) ELECTROSTATIC ATOMIZATION DEVICE AND HYDROPHILIC TREATMENT DEVICE INCLUDING THE SAME

(75) Inventors: Tomohiro Yamaguchi, Moriyama (JP); Junpei Ohe, Hirakata (JP); Hiroshi Suda, Takatsuki (JP); Takayuki Nakada, Hikone (JP)

(73) Assignee: Panasonic Corporation, Osaka (JP)

( * ) Notice: Subject to any disclaimer, the term of this patent is extended or adjusted under 35 U.S.C. 154(b) by 473 days.

(21) Appl. No.: 13/062,268

(22) PCT Filed: Sep. 9, 2009

(86) PCT No.: PCT/JP2009/066052
§ 371 (c)(1),
(2), (4) Date: Mar. 4, 2011

(87) PCT Pub. No.: WO2010/030028
PCT Pub. Date: Mar. 18, 2010

(65) Prior Publication Data
US 2011/0163176 A1    Jul. 7, 2011

(30) Foreign Application Priority Data

Sep. 12, 2008   (JP) ................. 2008-235492

(51) Int. Cl.
*B05B 5/00* (2006.01)
*F23D 11/32* (2006.01)
*A01G 23/10* (2006.01)
*B05B 5/025* (2006.01)

(52) U.S. Cl.
USPC ............ 239/690; 239/3; 239/132; 239/128

(58) Field of Classification Search
USPC .......... 239/690–708, 128, 423, 433, 397.5, 239/129, 132, 133, 135, 3; 361/228, 226, 361/225; 62/129, 135, 92, 272; 261/140.1; 700/299
See application file for complete search history.

(56) References Cited

U.S. PATENT DOCUMENTS

| | | | |
|---|---|---|---|
| 5,726,733 A | 3/1998 | Lai et al. | |
| 6,871,654 B1 | 3/2005 | Berke et al. | |
| 7,567,420 B2 * | 7/2009 | Kobayashi et al. | 361/228 |
| 8,235,312 B2 * | 8/2012 | Suda et al. | 239/690 |
| 2008/0229606 A1 * | 9/2008 | Hirai et al. | 34/97 |
| 2008/0292450 A1 * | 11/2008 | Yano et al. | 415/116 |
| 2010/0025505 A1 | 2/2010 | Suda et al. | |

FOREIGN PATENT DOCUMENTS

| | | |
|---|---|---|
| CN | 2386823 Y | 7/2000 |
| JP | 06-269267 | 9/1994 |
| WO | WO 2008/007704 | 1/2008 |
| WO | WO 2008/072771 | 6/2008 |

OTHER PUBLICATIONS

Chinese Office Action, Application No. 200980135895.7, pp. 1-5, dated Jan. 7, 2013.

* cited by examiner

*Primary Examiner* — Len Tran
*Assistant Examiner* — Justin Jonaitis
(74) *Attorney, Agent, or Firm* — Wolf, Greenfield & Sacks, P.C.; Randy J. Pritzker

(57) ABSTRACT

An electrostatic atomization device (A) for increasing hydrophilicity of collected matter (15) that has low hydrophilicity and is attached to a surface of a processing subject (1). The device includes an atomization electrode (6), which generates electrostatically charged atomized water droplets to increase the hydrophilicity, a water supply member (8), which supplies water to the atomization electrode (6), and a voltage application member (9), which applies voltage to the water supplied to the atomization electrode (6).

7 Claims, 10 Drawing Sheets

ELECTROSTATIC ATOMIZATION DEVICE AND HYDROPHILIC TREATMENT DEVICE INCLUDING THE SAME

TECHNICAL FIELD

The present invention relates to an electrostatic atomization device that generates electrostatically charged atomized water droplets to increase hydrophilicity and to a hydrophilic treatment device including such an electrostatic atomization device.

BACKGROUND ART

Patent document 1 discuses a cleaning device that washes produce with water to remove collected matter such as soil and agricultural chemicals from the surface of the produce. The cleaning device removes the collected matter from the surface of the produce by agitating a water tank in a state in which the produce is placed in the water tank.

Citruses and the like are usually sold in a state in which wax is applied to their surfaces. Since collected matter such as wax has a low hydrophilicity, collected matter cannot be easily washed away even when using the conventional cleaning device of patent document 1. In addition, the cleaning device of patent document 1 is large and thus not suitable for normal household use.

Therefore, particularly in a normal household, collected matter such as wax must be manually rubbed off from the surface of a produce to remove the collected matter. This takes time and is very burdensome.
[Prior Art Document]
[Patent Document 1] Japanese Laid-Open Patent Publication No. 6-269267

DISCLOSURE OF THE INVENTION

Accordingly, the present invention provides an electrostatic atomization device that allows for collected matter having a low hydrophilicity such as wax to be easily washed away and a hydrophilic treatment device including such an electrostatic atomization device.

One aspect of the present invention provides an electrostatic atomization device for increasing hydrophilicity of collected matter that has low hydrophilicity and is collected on a surface of a processing subject. The electrostatic atomization device includes an atomization electrode which generates electrostatically charged atomized water droplets to increase the hydrophilicity. A water supply member supplies water to the atomization electrode. A voltage application member applies voltage to the water supplied to the atomization electrode. The electrostatically charged atomized water droplets are supplied onto the processing subject.

With the electrostatic atomization device, by supplying the electrostatically charged atomized water droplets onto the collected matter over a predetermined period, the collected matter may be easily removed just by performing washing with water. Since a special chemical agent or a large device is not necessary, the electrostatic atomization device is safely and inexpensively usable in a normal household.

The electrostatic atomization device preferably includes an opposing electrode spaced apart towards the processing subject from the atomization electrode. This ensures that a large amount of electrostatically charged atomized water droplets is supplied in a target direction.

In order to solve the above problems, the present invention provides a hydrophilic treatment device including the electrostatic atomization device and a housing box, which accommodates a processing subject. Preferably, the electrostatically charged atomized water droplets for increasing hydrophilicity are supplied from the electrostatic atomization device into the housing box.

As a result, by accommodating the processing subject in the housing box and supplying the electrostatically charged atomized water droplets from the electrostatic atomization device in this state, collected matter may thereafter be easily removed through simple washing with water. Thus, a special chemical agent and a large device are not necessary, and the housing box may be safely and inexpensively used for food storage, such as under-floor storage, in a normal household.

In the hydrophilic treatment device, preferably, $0.15 \times 10^{16}$ or more electrostatically charged atomized water droplets are generated per second. This increases hydrophilicity of the collected matter.

The hydrophilic treatment device preferably further includes a cleaning member, which supplies cleaning water into the housing box accommodating the processing subject of which the hydrophilicity of the collected matter has been increased to perform a cleaning process on the collected matter. Thus, the hydrophilic treatment and cleaning may be performed in a state in which the processing subject is accommodated in the housing box.

The present invention has an effect in which hydrophilicity of collected matter is increased by the electrostatically charged atomized water droplets, and collected matter is easily washed away through simple washing with water after atomization. Further, a special chemical agent and a large device are not necessary. Thus, the present invention may be safely and inexpensively used in a normal household.

DESCRIPTION OF EMBODIMENT

A preferred embodiment of the present invention will now be discussed with reference to the accompanying drawings.

Figure 1:
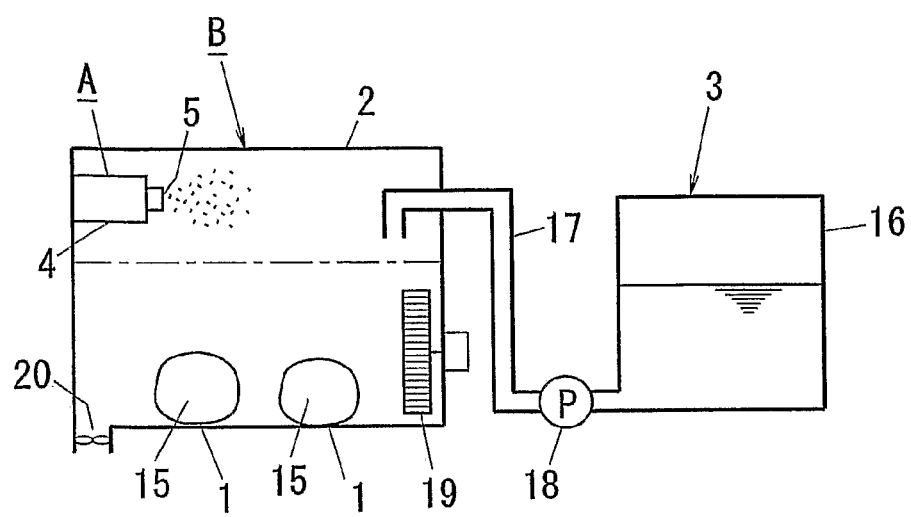
FIG. 1 is a schematic diagram showing a hydrophilic treatment device including an electrostatic atomization device in a preferred embodiment according to the present invention.

FIG. 1 schematically shows an embodiment of a hydrophilic treatment device B in an embodiment according to the present invention.

The hydrophilic treatment device B includes an electrostatic atomization device A, which generates and supplies a large amount of electrostatically charged atomized water droplets through an electrostatic atomization phenomenon, a housing box 2, which accommodates a processing subject 1, and a cleaning member 3, which performs a cleaning process on the processing subject 1 accommodated in the housing box 2. Each of these components will now be described in detail.

Figure 2:
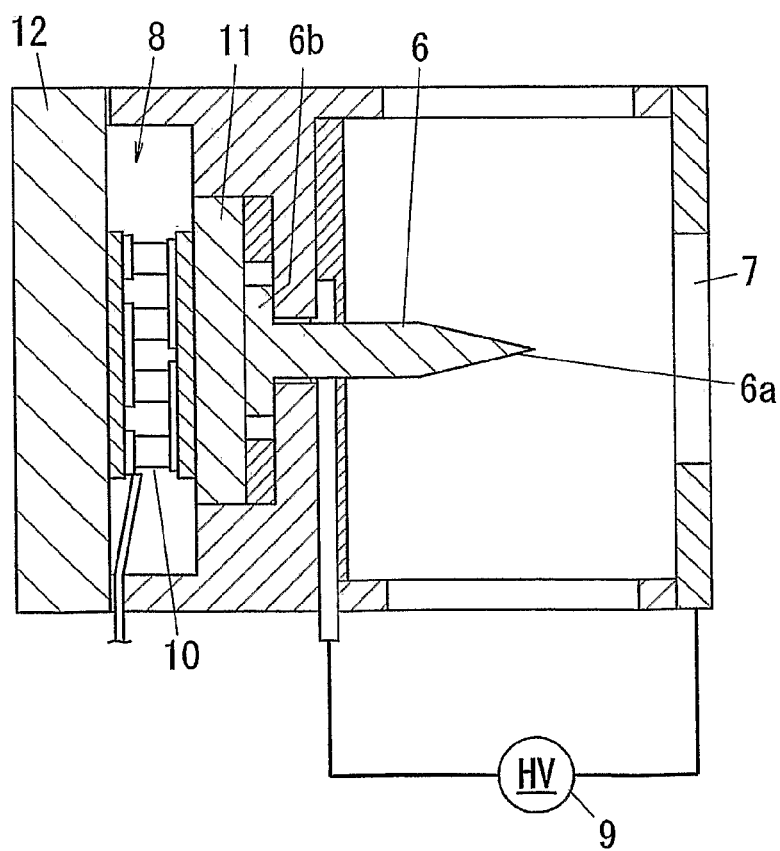
FIG. 2 is a cross-sectional view showing the structure of the electrostatic atomization device in FIG. 1.
Figure 3:
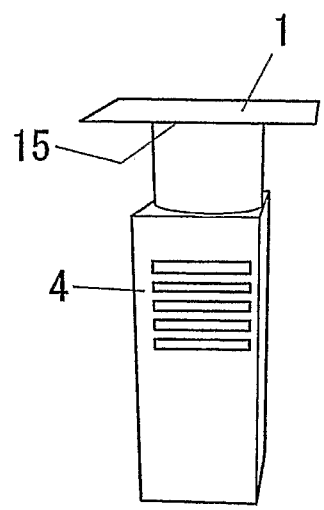
FIG. 3 is an explanatory diagram illustrating an experiment using the electrostatic atomization device of FIG. 1.

First, the electrostatic atomization device A will be described. The electrostatic atomization device A of the illustrated embodiment includes a device case 4 that houses each component shown in FIG. 2 and generates a large amount of electrostatically charged atomized water droplets, which are supplied out of the device case 4 through a discharge port 5 into the housing box 2. The device case 4 houses a rod-shaped atomization electrode 6, an opposing electrode 7 facing toward a distal portion 6a of the atomization electrode 6, a water supply member 8 that continuously supplies water to the atomization electrode 6, and a voltage application member 9 that causes the electrostatic atomization phenomenon by applying high voltage to the water supplied to the atomization electrode 6. In one embodiment, the electrostatic atomization device A generates electrostatically charged atomized water droplets at a rate of $0.15 \times 10^{16}$ (30 μmol/l) per second. In the present application, the supplying the electrostatically charged atomized water droplets may also be referred to as a droplet supplying or a spray process.

The water supply member 8 is configured to produce condensation water from the moisture included in air to supply the condensation water to the atomization electrode 6. The water supply member 8 includes a Peltier unit 10, which has a cooling side and a heat radiation side, a cooling plate 11, which is connected to the cooling side of the Peltier unit 10, and a heat radiation plate 12, which is connected to the heat radiation side of the Peltier unit 10. The cooling plate 11 is thermally coupled to a basal portion 6b of the atomization electrode 6. Radiation fins may also be connected to the heat radiation plate 12.

Figure 4:
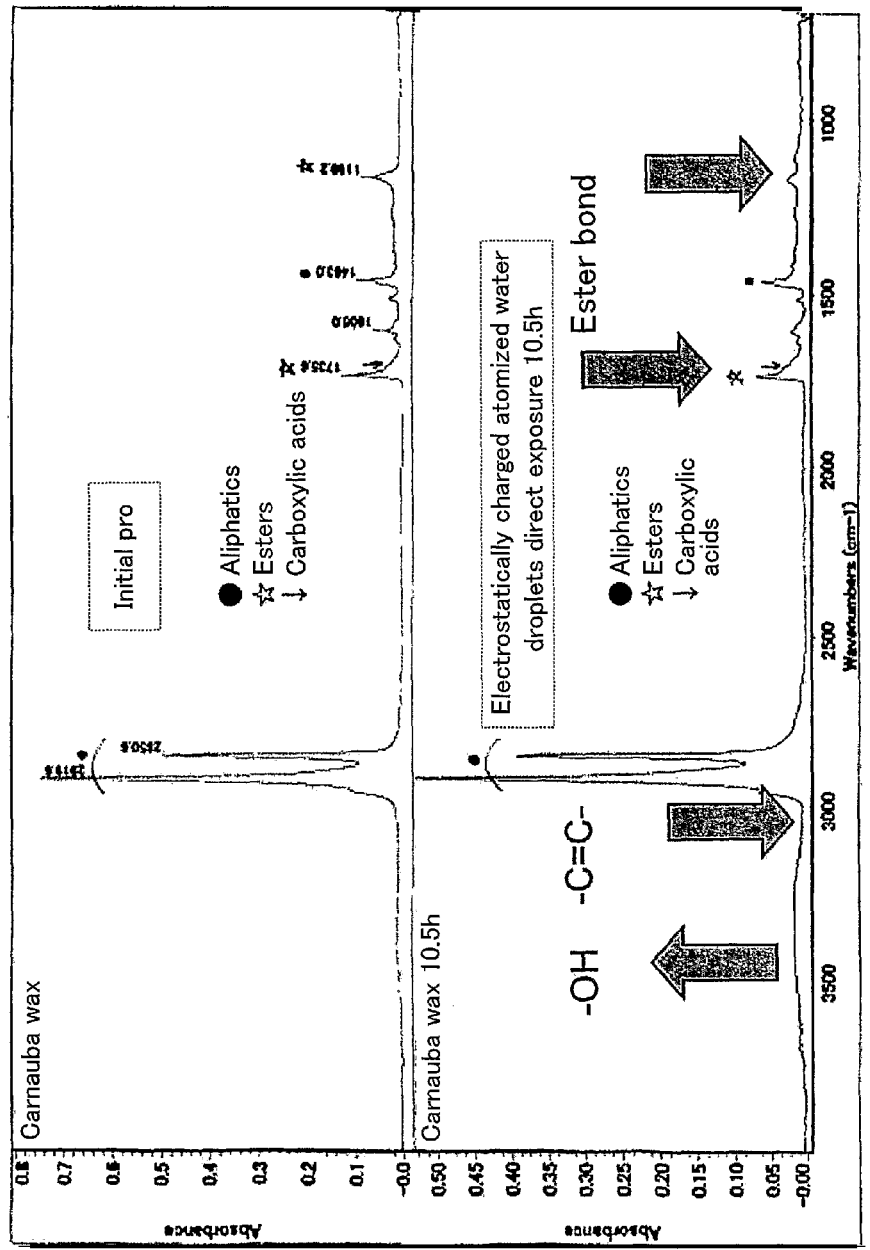
FIG. 4 is a graph showing the experimental results of FIG. 3.

In the electrostatic atomization device A of the illustrated embodiment, the atomization electrode 6 is cooled so that the condensation water is directly produced on the surface of the atomization electrode 6. The atomization electrode 6 and opposing electrode 7 applies a negative high voltage to the produced condensation water to cause a so-called Rayleigh breakup at the distal portion 6*a* of the atomization electrode 6 and continuously generate the electrostatically charged atomized water droplets. Therefore, no external water source equipment is needed.

The electrostatically charged atomized water droplets that are generated here are very small and have a particle diameter of nanometer size (e.g., 10 to 30 nanometers) and negatively charged. The electrostatically charged atomized water droplets include active species such as hydroxyl radicals that are simultaneously generated. Such active species are very highly reactive and normally do not exist in air for a long time. However, the active species in the electrostatically charged atomized water droplets are protected with water and thereby prolong the lifespan of the active species.

The electrostatic atomization device A is not limited to the illustrated embodiment as long as it generates a large amount of electrostatically charged atomized water droplets. The water supply member 8 may have a different structure so that it, for example, sequentially delivers water from a water storage unit such as a tank to the atomization electrode 6. In the illustrated embodiment, the opposing electrode 7 that pairs with the atomization electrode 6 is spaced apart from the atomization electrode 6 towards the processing subject 1. However, the opposing electrode 7 may be omitted. Even if the opposing electrode 7 is omitted, the electrostatically charged atomized water droplets may be generated by applying negative high voltage to the atomization electrode 6. However, in order for a hydrophilic action, which will be described later, to sufficiently affect collected matter 15 on the processing subject 1, the electrostatically charged atomized water droplets are preferably generated at a rate of $0.15\times10^{16}$ (30 μmol/l) or more per second.

The housing box 2 and the processing subject 1, which is housed in the housing box 2 will now be described. The housing box 2 is hermetically sealed in a state in which one or more processing subjects 1 are arranged therein. The collected matter 15 that has low hydrophilicity is applied to the surface of the processing subjects 1. Citruses such as grapefruits or lemons are used as an example of the processing subject 1. Further, wax applied to the citrus surface is used as an example of the collected matter 15 that has low hydrophilicity. The wax functions as a protective film and lusters the citrus surface. Carnauba wax, Shellac wax, beeswax, and the like may be used as the wax. The wax repels water since it is hydrophobic and thus cannot be easily washed away with water.

The cleaning member 3 for the housing box 2 will now be described. The cleaning member 3 includes a water tank 16, which contains cleaning water, a water supply passage 17, which connects the water tank 16 and the housing box 2, a water supply pump 18, which is arranged in the water supply passage 17, an agitator 19, which is arranged in the housing box 2, and a drain outlet 20, which is formed in the bottom of the housing box 2 and opens and closes freely. The cleaning water in the water tank 16 is supplied to the housing box 2 using the water supply pump 18 after closing the drain outlet 20. Then, the agitator 19 is driven in a state in which the processing subjects 1 are immersed in the cleaning water (indicated by broken line in the drawing). This washes away the collected matter 15 from the surfaces of the processing subjects 1. After the cleaning is completed, the drain outlet 20 opens to drain water from the housing box 2.

In the hydrophilic treatment device B of the illustrated embodiment, suitable processing subjects 1 are first arranged in the housing box 2. In this state, the electrostatic atomization device A is continuously driven to supply a large amount of electrostatically charged atomized water droplets into the housing box 2. As a result, the collected matter 15, which has a low hydrophilicity, on the surfaces of the processing subjects 1 is continuously exposed to the large amount of electrostatically charged atomized water droplets. The hydrophilic action of the electrostatically charged atomized water droplets increases the hydrophilicity of the collected matter 15. This hydrophilic treatment will be discussed later using experimental results and the like.

After increasing the hydrophilicity of the collected matter 15 to a predetermined level, the cleaning member 3 washes the processing subjects 1 with water in the housing box 2 to wash away the collected matter 15 from the processing subjects 1 without troublesome tasks such as hand-washing. Furthermore, the hydrophilic treatment eliminates the need for a special chemical agent or large device. This allows for use of the hydrophilic treatment device B in a normal household in a safe and inexpensive manner.

The hydrophilic treatment performed with the electrostatically charged atomized water droplets will now be described in further detail. In the experiment shown in FIG. 3, aluminum foil was used as the processing subject 1, Carnauba wax was applied to the surface of the aluminum foil as the collected matter 15, and the Carnauba wax was directly exposed to the electrostatically charged atomized water droplets atomized by the electrostatic atomization device A continuously for 10.5 hours. FIG. 4 shows the results of FT-IR analyses conducted on the Carnauba wax before and after the direct exposure.

The upper side of FIG. 4 shows the results for the IR analysis conducted on the Carnauba wax before supplying the electrostatically charged atomized water droplets, and the lower side of FIG. 4 shows the results of the IR analysis conducted on the Carnauba wax after supplying the electrostatically charged atomized water droplets for 10.5 hours. The comparison of before and after the direct exposure shows that after the direct exposure, the unsaturated double bond (—C=C—) and the ester bond decreased, and the hydroxyl group (—OH) increased. This suggests that the action of the active species such as hydroxyl radical contained in the electrostatically charged atomized water droplets decreased the unsaturated double bond and ester bond of the Carnauba wax and produced low-molecules, while increasing the hydroxyl group, and as a result, increasing the hydrophilicity of the Carnauba wax.

Figure 5:
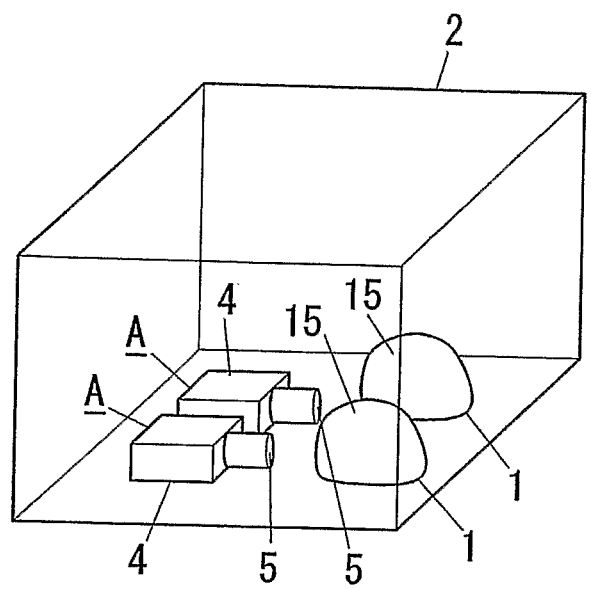
FIG. 5 is an explanatory diagram illustrating a further experiment using the electrostatic atomization device of FIG. 1.
Figure 6:
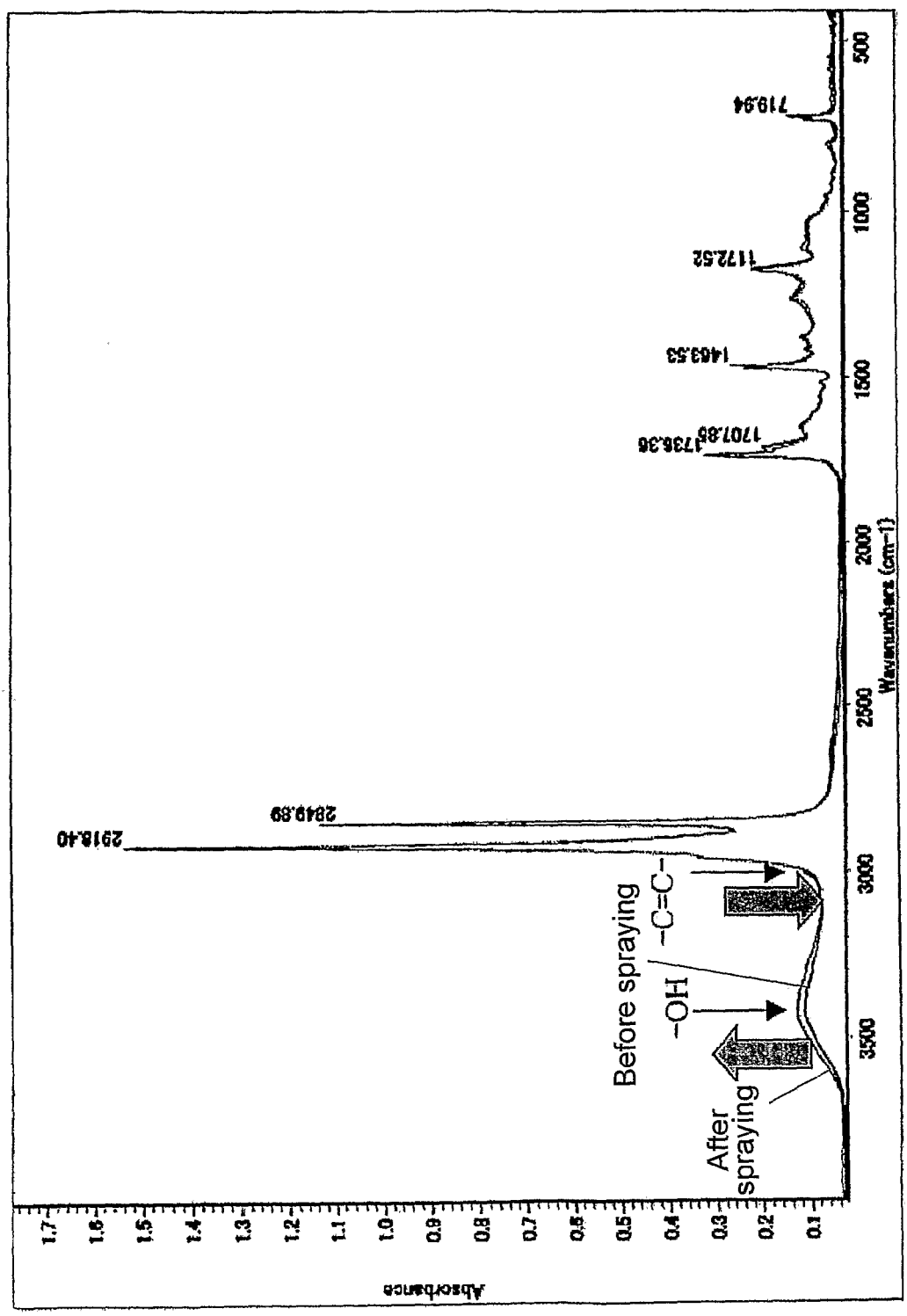
FIG. 6 is a graph showing the experimental results of FIG. 5.

In another experiment shown in FIG. 5, a commercially available grapefruit was used as the processing subject 1, and the electrostatically charged atomized water droplets were supplied from the electrostatic atomization device A onto wax, which was the collected matter 15 applied to the surface of the grapefruit. FIG. 6 shows the results of FT-IR analyses conducted before and after the droplet supplying. FIG. 7 shows the residual amount of the collected matter 15 when agitated washing with water was performed after the after the droplet supplying.

In this experiment, two halves of grapefruits were arranged in the housing box 2, which has a capacity of 8 liters, and the electrostatically charged atomized water droplets were continuously supplied in the housing box 2 by the electrostatic atomization device A, which was also arranged in the housing box 2. The environment in the housing box 2 was such that the temperature was 5° C. and the humidity was 99%. Further, the electrostatic atomization device A was continuously driven in the housing box 2. Two electrostatic atomization devices A were arranged in the housing box 2. Thus, electrostatically charged atomized water droplets were continuously atomized and supplied at a rate of about $0.3 \times 10^{16}$ per second.

FIG. 6 shows in an overlapped manner the analysis results of the wax before supplying the electrostatically charged atomized water droplets and the analysis results of the wax after supplying the electrostatically charged atomized water droplets for over one day. As shown by the arrows, comparison of before and after the droplet supplying shows that after the droplet supplying, the absorption caused by the unsaturated double bond (—C=C—) decreased, and the absorption caused by the hydroxyl group (—OH) increased. This suggests that the action of the active species such as hydroxyl radical contained in the electrostatically charged atomized water droplets decreased the unsaturated double bond in the wax, produced low-molecules, increased the hydroxyl group in the wax, and, as a result, increased the hydrophilicity of the wax.

Figure 7A:
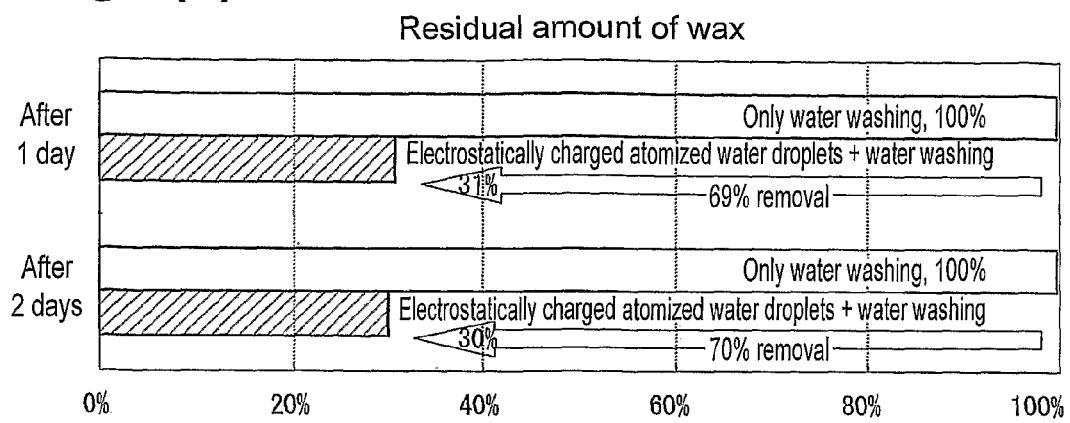
FIG. 7 is a graph showing the experimental results of FIG. 5, in which FIG. 7($a$) shows the wax residual amount, FIG. 7($b$) shows the residual amount of imazalil, and FIG. 7($c$) shows the residual amount of thiabendazole (TBZ)

FIG. 7(a), which shows the residual amount of wax after performing agitated washing with water, compares a case in which the electrostatic atomization device A was continuously driven to supply electrostatically charged atomized water droplets over one day in the housing box 2 and a case in which the electrostatic atomization device A was continuously driven to supply electrostatically charged atomized water droplets over two days. The agitated washing with water was performed by immersing the grapefruits in a beaker filled with water and carrying out agitation over one minute at a rotation speed of about 60 rotations per minute.

As shown in the drawing, when electrostatically charged atomized water droplets were not supplied, the wax could not be washed away when performing agitated washing with water through the method described above. However, when supplying electrostatically charged atomized water droplets for over one day, 69% of the wax was removed by the agitated washing with water performed after supplying the electrostatically charged atomized water droplets. Moreover, if supplying the electrostatically charged atomized water droplets over two days, 70% of the wax was removed by the agitated washing with water performed after the droplet supplying. The above experimental results show that the hydrophilicity of the wax, which is the collected matter 15, is increased by supplying a predetermined amount of more of electrostatically charged atomized water droplets for a predetermined period and thereby allows for the wax to be easily removed through washing with water.

Figure 7B:
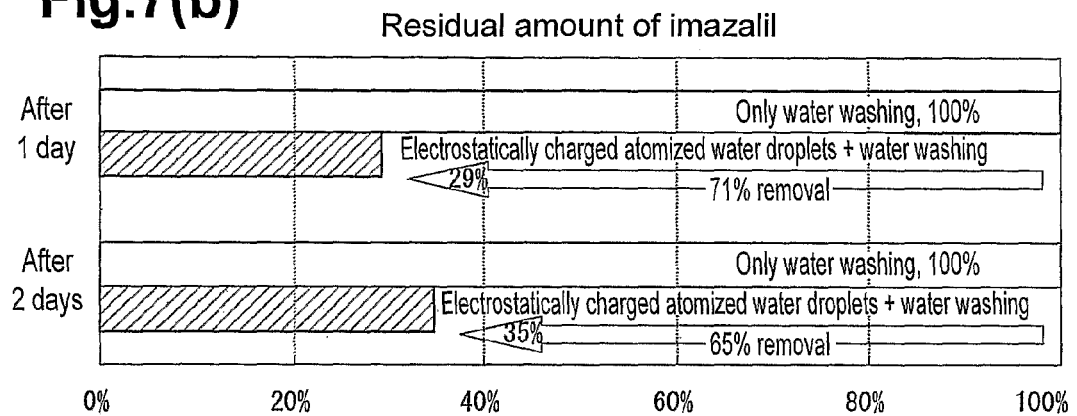
Figure 7C:
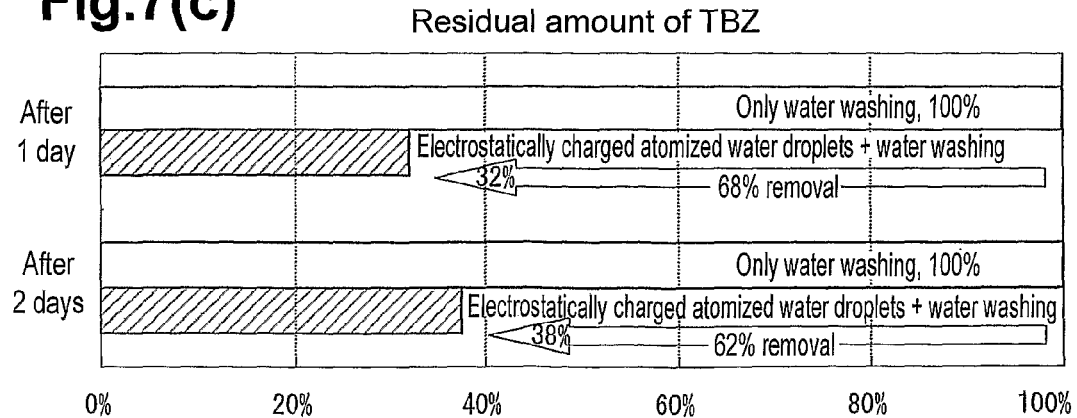

FIGS. 7(b) and 7(c) show the residual amount of the fungicide after performing agitated washing with water. FIG. 7(b) shows the residual amount of imazalil, and FIG. 7(c) shows the residual amount of TBZ. In the same manner as wax, it is apparent that these fungicides could not be washed away just by performing agitated washing with water. However, the fungicides could be eliminated by performing agitated washing with water after supplying the electrostatically charged atomized water droplets over one day or longer. Since a small amount of these fungicides is contained in the wax, it is difficult to determine whether or not the fungicides were modified so as to be hydrophilic. However, it may be considered that the fungicides were at least washed away by the agitated washing with water.

Here, one half of the same grapefruit was used for the measurement of an initial amount of wax or the like, and the other half was washed with water after the droplet supplying and thereby used as the processing subject 1.

Figure 8:
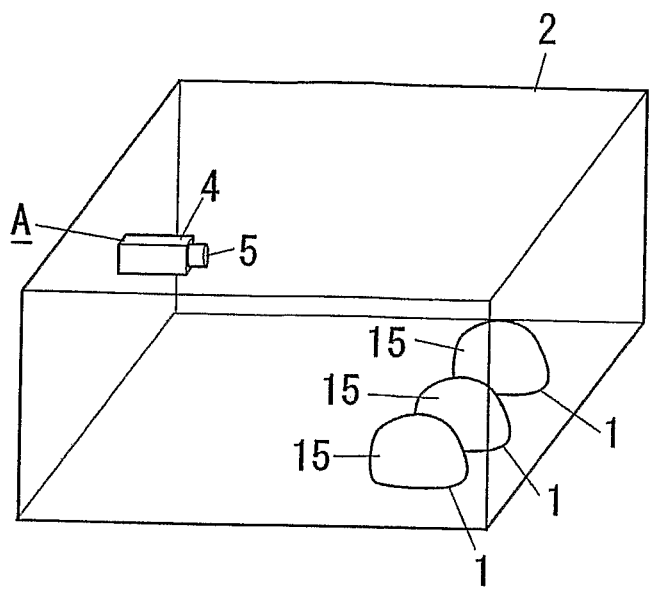
FIG. 8 is an explanatory diagram showing another further experiment using the electrostatic atomization device of FIG. 1.
Figure 9:
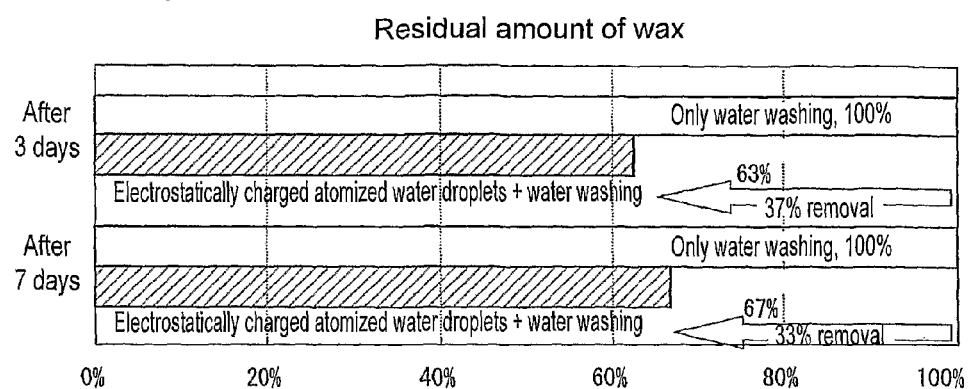
FIG. 9 is a graph showing the experimental results of FIG. 8.
Figure 10:
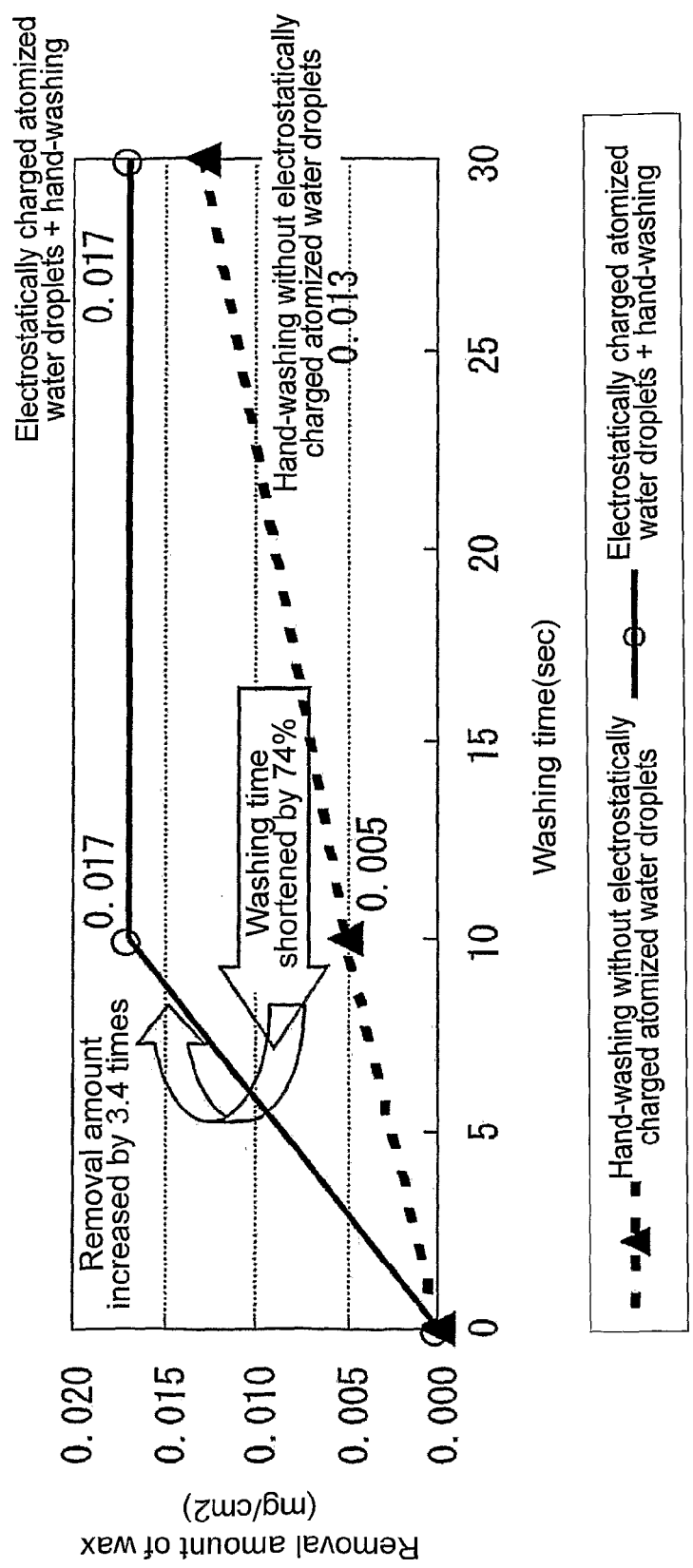
FIG. 10 is a graph showing the experimental results of FIG. 8.

In another experiment shown in FIG. 8, three grapefruits, serving as the processing subjects 1, were each cut in half and arranged in the housing box 2 having a capacity of 70 L. Then, about $0.15 \times 10^{16}$ electrostatically charged atomized water droplets were supplied in the housing box 2 for over one second from the single electrostatic atomization device A arranged in the housing box 2. The housing box 2 was in an environment in which the temperature was 5° C. and the humidity was 99%, and the electrostatic atomization device A was continuously driven in the housing box 2. FIG. 9 describes the removal of the collected matter 15 by the stirring and the washing with water, and FIG. 10 illustrates the removal of the collected matter 15 performed through hand-washing (rub-washing). Here, one half of the same grapefruit was used for the measurement of an initial amount of wax or the like, and the other half was washed with water after the droplet supplying and thereby used as the processing subject 1.

FIG. 9 shows the residual amount of wax, which is the collected matter 15, after the agitated washing with water and compares a case in which the electrostatic atomization device A was continuously driven to supply electrostatically charged atomized water droplets for over three days in the housing box 2 and a case in which the electrostatic atomization device A was continuously driven to supply the electrostatically charged atomized water droplets for over seven days. The agitated washing with water was performed by immersing the grapefruits in a beaker filled with water and agitating the water for over one minute at a rotation speed of about 60 rotations per minute in the same manner as the experiment shown in FIG. 5 and the like.

As shown in the drawing, when supplying electrostatically charged atomized water droplets for over three days, 37% of the wax was removed by the agitated washing with water after the droplet supplying. Further, after supplying the electrostatically charged atomized water droplets for over seven days, 33% of the wax was removed by the agitated washing with water. From these above experimental results, it is apparent that although the removal rate is inferior to that of the experiment shown in FIG. 5 and the like, as long as the electrostatically charged atomized water droplets are continuously atomized for about three days under such conditions, the wax could be removed by the agitated washing with water.

FIG. 10 shows the difference in the removed amount of wax through hand-washing when the electrostatically charged atomized water droplets were not atomized and when the electrostatically charged atomized water droplets were atomized for three days in the housing box 2. As shown in the drawing, when the electrostatically charged atomized water droplets were atomized for over three days before removing the wax through hand-washing, in comparison to when the electrostatically charged atomized water droplets were not atomized, the wax was removed at a rate that was about 3.4 greater per ten seconds. It is also apparent that the hand-wash time necessary for removing 0.01 mg/cm$^2$ of wax was shortened by about 74% when electrostatically charged atomized water droplets were atomized for three days compared to when the electrostatically charged atomized water droplets were not atomized.

Figure 11:
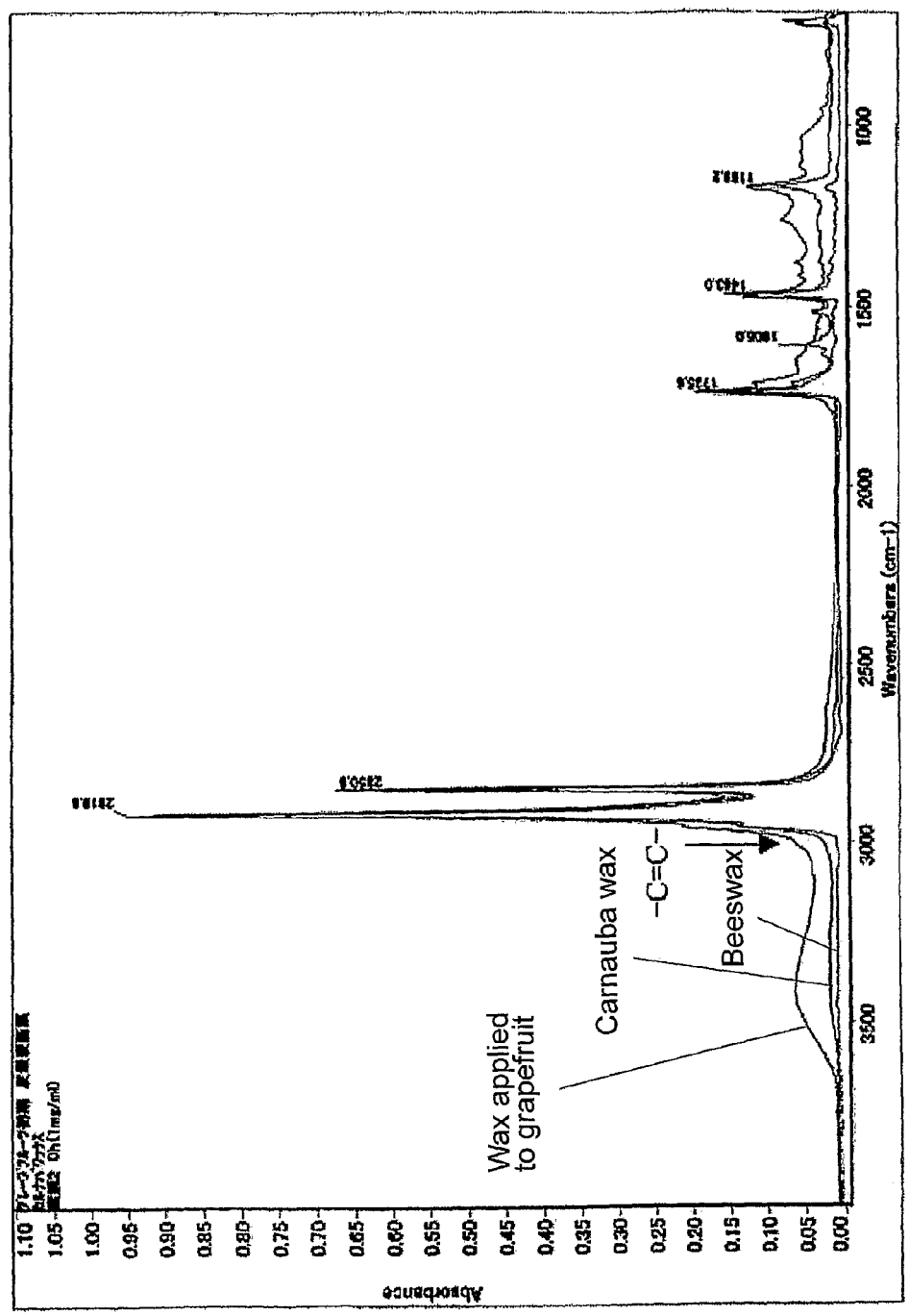
FIG. 11 is a graph comparing the IR results for various types of waxes.

In the experiment shown in FIG. 5 and the like and the experiment shown in FIG. 8 and the like, the electrostatically charged atomized water droplets were atomized onto the wax, which serves as the collected matter 15 and which was applied to a commercially available grapefruit. The wax is Carnauba wax, Shellac wax, beeswax, or one that is suitable and similar to theses waxes. FIG. 11 shows the results of FT-TR analyses conducted on wax applied to the commercially available grapefruit, Carnauba wax, and beeswax in an overlapping manner. As shown in the drawing, the wave number indicating peaks is substantially the same for each wax.

The same tendency as that in the experimental results of FIGS. 4, 6, 7, 9, and 10 was also obtained when using produce other than grapefruits as the processing subject 1.

The atomization period for the electrostatically charged atomized water droplets was appropriately set in accordance with the attached amount and type of the collected matter 15.

The invention claimed is:

1. A hydrophilic treatment device comprising:
   an electrostatic atomization device for increasing hydrophilicity of collected matter that has low hydrophilicity and is collected on a surface of a processing subject, the electrostatic atomization device including:
   an atomization electrode which generates electrostatically charged atomized water droplets;
   a water supply member which supplies water to the atomization electrode; and
   a voltage application member which applies voltage to the water supplied to the atomization electrode;
   a housing box which includes a hermetically-sealable interior space for accommodating the processing subject and the electrostatic atomization device, wherein the electrostatically charged atomized water droplets are supplied from the electrostatic atomization device to the processing subject in the hermetically-sealable interior space of the housing box to increase the hydrophilicity of the collected matter; and
   a cleaning member which supplies cleaning water into the hermetically-sealable interior space of the housing box so that the processing subject of which the hydrophilicity of the collected matter has been increased is immersed in the cleaning water to perform a cleaning process on the collected matter.

2. The hydrophilic treatment device according to claim 1, wherein the electrostatic atomization device further includes:
   an opposing electrode spaced apart towards the processing subject from the atomization electrode.

3. The hydrophilic treatment device according to claim 1, wherein:
   the water supply member includes a cooling device thermally coupled to the atomization electrode to cool the atomization electrode so as to continuously produce condensation water on a surface of the atomization electrode; and
   the atomization electrode causes Rayleigh breaks-up of the condensation water to generate the electrostatically charged atomized water droplets.

4. The hydrophilic treatment device according to claim 1, wherein the processing subject includes produce, and the collected matter having low hydrophilicity includes a wax applied on the produce.

5. The hydrophilic treatment device according to claim 1, wherein $0.15 \times 10^{16}$ or more electrostatically charged atomized water droplets are generated in one second.

6. A method for increasing hydrophilicity of collected matter that has low hydrophilicity and is collected on a surface of a processing subject the method comprising:
   continuously supplying electrostatically charged atomized water droplets generated by the electrostatic atomization device according to claim 1 onto the processing subject for a predetermined period.

7. A method for removing collected matter that has low hydrophilicity and is collected on a surface of a processing subject by performing washing with water, the method comprising:
   continuously supplying electrostatically charged atomized water droplets generated by the electrostatic atomization device according to claim 1 onto the processing subject for a predetermined period to increase the hydrophilicity of the collected matter before washing the processing subject with water.

* * * * *